United States Patent

Toyama

[15] 3,643,538
[45] Feb. 22, 1972

[54] MOUTHPIECE OF WIND INSTRUMENTS

[72] Inventor: Nobuo Toyama, 375 Yodobashi, Shinjuku-ku, Tokyo, Japan

[22] Filed: Mar. 19, 1970

[21] Appl. No.: 21,039

[52] U.S. Cl. ................................................................84/384
[51] Int. Cl. ..........................................................G10d 7/02
[58] Field of Search ...................................84/380, 383, 384

[56] References Cited

UNITED STATES PATENTS

| | | | |
|---|---|---|---|
| 239,613 | 4/1881 | Langrehr | 84/452 X |
| 2,944,459 | 7/1960 | Simmonds | 84/383 X |
| 3,030,845 | 4/1962 | Scherer | 84/384 |
| 3,178,986 | 4/1965 | Moeck | 84/384 |

Primary Examiner—Stephen J. Tomsky
Assistant Examiner—Lawrence R. Franklin
Attorney—Steinberg & Blake

[57] ABSTRACT

In a mouthpiece of wind instruments and the like, the improvement comprising an outer barrel portion and a thin-walled wind slot portion having a disc mounted at its base, said portions being combined together and connected to a hollow cylinder portion such that the wind slot portion is surrounded by the outer barrel portion.

6 Claims, 6 Drawing Figures

PATENTED FEB 22 1972
3,643,538
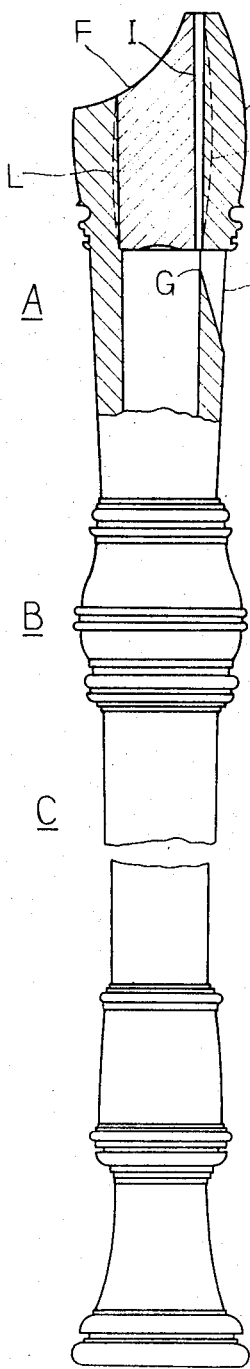
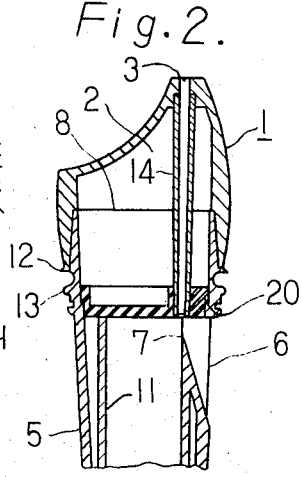
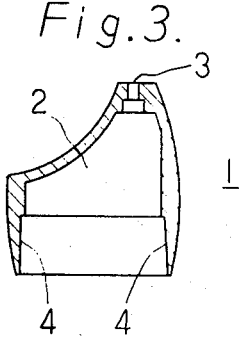
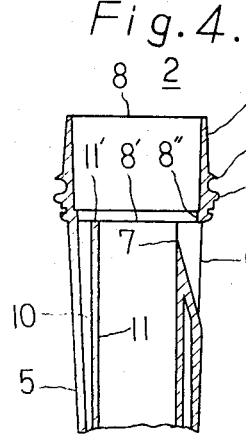
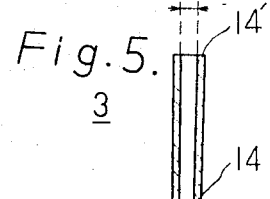
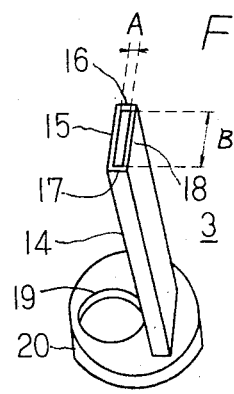
INVENTOR
NOBUO TOYAMA
BY Steinberg + Blake
ATTORNEYS

MOUTHPIECE OF WIND INSTRUMENTS

DETAILED DESCRIPTION OF THE INVENTION

The present invention relates to improvements in a mouthpiece of wind instruments or the like made of plastic, metal or like material which is sensitive to ambient temperature, and the primary object of the invention is to improve the construction of the mouthpiece so as to allow immediate conformation of the wind slot to temperature of the wind or breath blown thereinto and to perfectly prevent generation of a liquid film which may otherwise be formed in the slot due to liquefaction of the breath blown thereinto, thereby to allow permanent maintenance of the correct tones of the instrument.

The invention will now be described in detail with reference to the accompanying drawings, in which:

FIG. 1 is a general view of a conventional wind instrument shown here for convenience sake for comparative illustration of he characteristic construction of the present invention, with a mouthpiece portion being shown in longitudinal section; and FIGS. 2 to 6 show a preferred embodiment of a mouthpiece according to the present invention, where FIG. 2 is a longitudinal sectional view of the entire mouthpiece, FIG. 3 is a longitudinal sectional view of the outer barrel of the mouthpiece, FIG. is longitudinal sectional view of the connecting portion of the mouthpiece to a hollow cylinder, FIG. 5 is a longitudinal sectional view of a wind slot assembly having a disc secured at its base, and FIG. 6 is a perspective view of the wind slot assembly.

For better understanding of the contrivance of the present invention, conventional plasticmade wind instruments of a most popularly used type will be illustrated by referring to FIG. 1. In the figure, A designates a mouthpiece, B a connector portion and C a hollow cylinder or column. Usually, the above-said component parts of his conventional article are formed by a plastic molding method. That is, the mouthpiece A is formed integrally with its barrel portion E and edge G by a single mold, and then a plug F is inserted into the hollow of the barrel above the edge in such a manner as to define a wind slot I, through which wind or breath is blown in, between the inner wall of the barrel and the outer face of the plug.

As will be noticed from the figure, the barrel structure E has a thick-walled portion and a thin-walled portion. Formation of such thick- and thin-walled portions is a very natural consequence of the necessity of providing peculiar or natural elegance or other such effect to the external appearance of the wind instrument in order to enhance its commercial value, because if no such peculiarity is given to the outer configuration of the mouthpiece, the commercial value of the product will be lowered no matter how delicate its workmanship is. As is well known, in case of shaping a windpipe from plastic, pressure is applied thereto under an extremely high temperature, so that when the molding is taken out from the there here are produced different degrees of strain in the thick-walled portion and the thin-walled portion. That is, larger strain is produced in the thick-walled portion than in the thin-walled portion, so that the thick-walled portion is curved in a manner shown by the dotted lines K and L in FIG. 1 and is unable to maintain a straight line. Such strains are also produced due to variation of atmospheric temperature which is changed from season to season. It is therefore required to correct deformation or dislocation, in the positional relationship between the slot I and the edge G, which is inevitably caused when the plug F having strain of its own form is inserted into the distorted outer barrel. In addition to such mechanical defects, the conventional wind instrument is also subject to effects of atmospheric temperature. Particularly in the winter season when there is a wide difference between the temperature in the instrument and that of the breath blown thereinto, the blown-in breath will be liquefied in the wind slot to form a liquid film therein. Since the plug thickness is added to the wall thickness of the outer barrel, it takes a long time for the wind slot to become adapted to temperature of the breath.

Moreover, since the wind slot is closely attached with the outer barrel and the plug, ambient temperature is transmitted through the outer barrel and the plug and acts to lower the temperature in the slot, resulting in producing liquid films which may be attached to the inner wall of the wind slot during performance of the instrument to produce detrimental effects to the tone and timbre which is the most important factor for good playing of an instrument.

With a view to overcoming these defects of the conventional devices, the present invention proposes an improvement comprising the fact that instead of using the conventional plug in the mouthpiece, a thin-walled wind slot assembly having a disc member for connecting purpose and an outer barrel portion are prepared separately, and these are combined together and then joined to the main hollow cylinder to thereby form a finished assembly.

The more detailed process for forming the assembly will be described with reference to the accompanying drawings. Referring first to FIG. 3, there is shown an outer barrel structure, generally designated by reference number 1, which is crowned or mounted at top of a mouthpiece 5 and has a hollow portion 2. At one end of said outer barrel structure 1 is formed an aperture 3 aligned axially with the wind slot to be described later, and the inner peripheral edge at the other end is formed with an outward taper 4. The general external shape of the structure is substantially same as the conventional articles.

In FIG. 4 is shown an inlet terminal portion of the air column or hollow cylinder 5 adapted to be fitted or connected with the mouthpiece connector 2. In the same figure, 6 denotes an exhaust opening through which the blown-in breath or wind is exhausted outside of the pipe, 7 an edge, and 8 a terminal block where the connection with the mouthpiece is effected. The terminal block 8 has its outer periphery tapered inwardly as denoted by number 9. It is also to be noted that the wall portion provided symmetrically with respect to the edge 7 is of a double-wall structure, with a hollow 10 being formed between the two wall members. The top end 11' of the inner wall 11 is arranged horizontally in abutment with the bottom 8' of the terminal block 8. The inner periphery of the bottom portion 8' is tapered downwardly as indicated by number 8''. Designated by numbers 12 and 13 are respectively projections provided for ornamental purpose.

Referring now to FIGS. 5 and 6, there is shown the wind slot assembly 3 in a more detailed manner. As will be noted, the slot structure 14 is defined by the four thin walls 15, 16, 17 and 18 such as to form an opening having a predetermined width of B and a predetermined length of A. The bottom end of said slot structure is integrally joined to a disc 20 having formed therein a circular recess 19. The circumference of said disc 20 is equal to the inner circumference of the bottom portion 8' of the mouthpiece connector 2. At the outer periphery of the disc is also provided a taper 21 adapted to closely fit with the corresponding taper 8'' formed at the bottom portion of the terminal block 8 of the air column 5.

FIG. 2 illustrates the completed assemblage of the above-said component parts, namely the outer barrel structure 1, the mouthpiece connector 2 and the wind slot structure 3. It will be seen that the disc 20 of the slot assembly 14 is inserted into the terminal block 8 of the mouthpiece connector 2 in such a manner that the taper 21 around the outer periphery of said disc 20 is pressedly fitted with the taper 8'' formed at the bottom of said terminal block 8, and at the same time the top end 11' of the inner wall 11 of the air column 5 is positioned in tight abutment with the underside of the disc 20. Then, the outer barrel structure 1 is mounted on the terminal block of the main hollow cylinder or air column in such a manner that the open end 14' of the slot structure 14 will be closely fitted into the opening 3 in the outer barrel structure 1 in aligned relation with each other and that the outer barrel structure will be fitted on the tapered periphery 9 of the terminal block and secured thereto by means of a suitable adhesive.

Thus, the component parts 1, 2 and 3 are fabricated in the manner described above and also the walls 15, 16, 17 and 18 constituting the slot structure 14 are of a fixed thin thickness, so that even if the temperature in the slot happens to be lower than the temperature of the breath blown thereinto, quick and uniform adaptation to the breath temperature is achieved, thus minimizing or reducing to zero the rate of liquefaction of the blown-in breath. Further, in case of shaping the slot under heating, the four walls 15, 16, 17 and 18 are selected to be of uniform thickness, so that when the shaped slot assembly is removed from the mold, the resultant strains in said walls, if any, are substantially equal to each other so that there is produced no such distortion or deformation as shown by the dotted line K in FIG. 1, which often takes place in the wind slot I of a conventional instrument. Thus in the present invention, the stream of wind blown through the slot properly contacts the top of the edge 7 to produce the correct tones.

The present invention is also characterized by the fact that said slot assembly 14 is enclosed with the outer barrel 1 in such a manner as to form a hollow portion 2 between said barrel and slot assembly. This assures perfect protection of the wind slot against direct effects of ambient temperature to which the outer barrel 1 is exposed. Also, if cotton or other foamed material is stuffed in said hollow portion, it will keep the wind slot insulated from ambient temperature, allowing to perfectly inhibit liquefaction of the breath during performance even at cold temperatures. It should also be noted that the wind slot assembly 3 is completely separated from the outer barrel structure 1, so that should strain be produced due to nonuniform thickness of the cylindrical structure, the slot assembly remains unaffected at all by such strain. Attention should also be given to the facts that the joining between the outer barrel structure 1 and the terminal block 8 is achieved by tapered engagement and that same tapered fit is employed for effecting secure coupling between the disc 20 of the slot assembly and the bottom portion 8' of the terminal block, with the top end 11' of the inner wall 11 of the hollow 5 being securely bonded to the underside of said disc, so that there is no fear that vibration or resonance thereof should take place at the bottom of the disc.

I claim:

1. In a wind instrument, an elongated main hollow cylinder and a hollow outer mouthpiece barrel structure fixed to and forming an extension of said cylinder so that said barrel structure and cylinder define a hollow interior space, said barrel structure being formed at one end with an opening, and a wind-slot assembly situated within said hollow space, said assembly including a disc extending across said hollow space and formed with an opening passing therethrough and an elongated tubular thin-walled member extending between and communicating with said openings so that it is possible to blow into said opening of said barrel structure and through said thin-walled tubular member beyond said disc, said thin-walled tubular member being spaced from and surrounded by said barrel structure said hollow cylinder having an exhaust opening with an edge adjacent to and spaced from the end of said tubular member such that wind blown through the tubular member would cooperate with the opening and edge to produce the musical tones.

2. The combination of claim 1 and wherein said openings are of an elongated slot-shaped configuration and wherein said thin-walled tubular member is composed of flat thin walls defining an elongated passage of rectangular cross section conforming substantially to the configuration of said openings.

3. The combination of claim 2 and wherein said main hollow cylinder has outer and inner walls forming a double-wall structure, and said outer and inner walls of said main hollow cylinder being joined together and defining an elongated edge which is situated in the region of but spaced from and extends in the same direction as said opening of said disc.

4. The combination of claim 3 and wherein said main hollow cylinder has an internal tapered annular surface portion and said disc has an external annular tapered surface portion engaging and mating with the tapered surface portion of said cylinder.

5. The combination of claim 4 and wherein said inner wall of said main hollow cylinder terminates closer to said disc then said edge in an end directly engaged by said disc.

6. The combination of claim 5 and wherein said outer barrel structure and said main hollow cylinder have coacting matching tapered surfaces engaging each other for interconnecting said hollow cylinder and barrel structure.

* * * * *